Patented Feb. 16, 1943

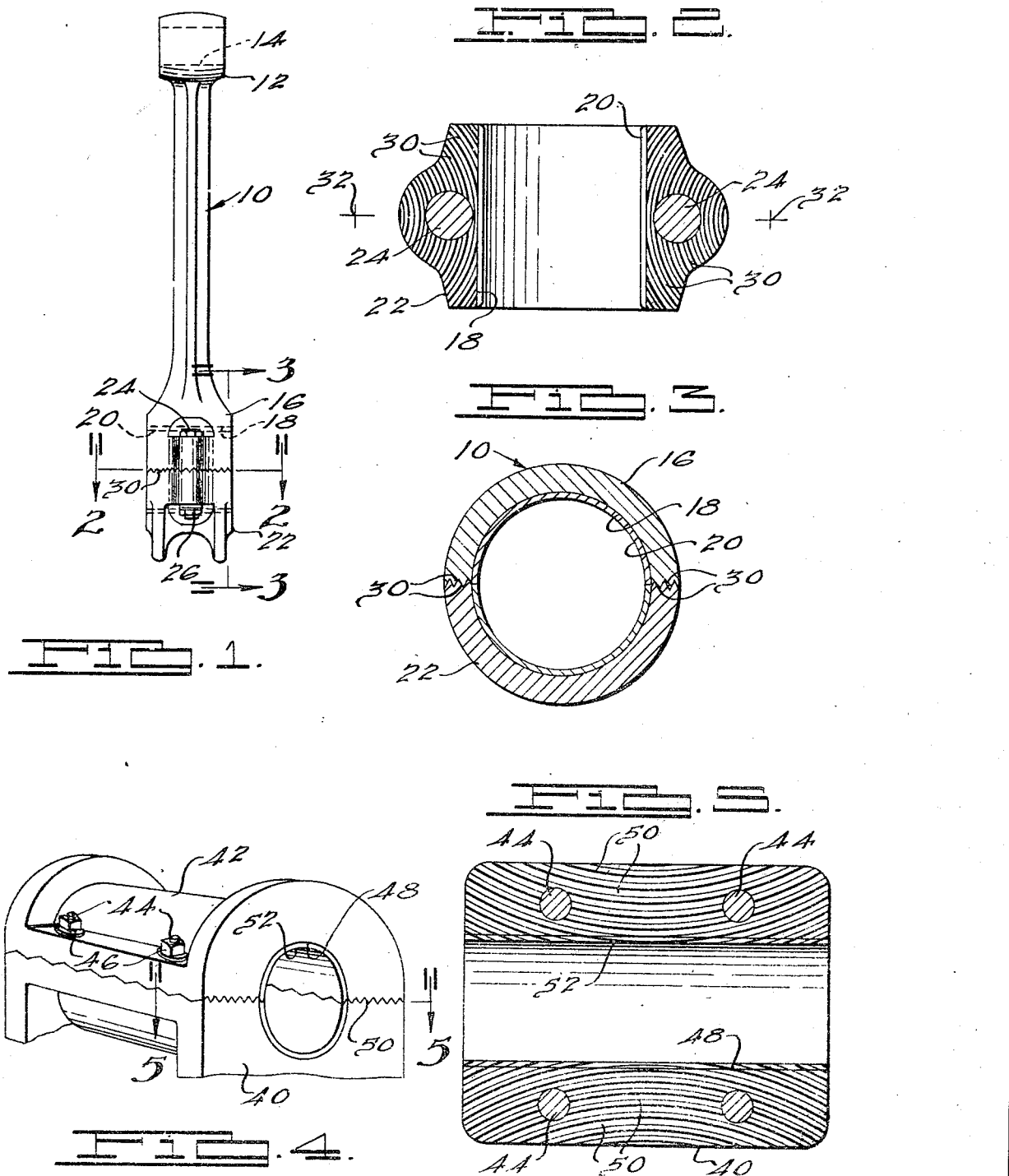

2,311,434

UNITED STATES PATENT OFFICE 2,311,434

CONNECTION

Julius Dusevoir, Dearborn, Mich., assignor to Century Motors Corporation, Dearborn, Mich., a corporation of Michigan Application November 1, 1941, Serial No. 417,490

5 Claims. (Cl. 308—74)

This invention relates to connections between pairs of members each having a pair of spaced surfaces adapted for contacting engagement with corresponding faces of the other member. It is particularly adaptable for use in connection with bearing caps for rotatable shafts, or the like, and for that reason, in the interest of simplicity of description, only its application to such use will hereinafter be described, its application to other uses thereby being made apparent to those skilled in the art. Accordingly, it will be understood that reference to bearing caps of the following specification and claims is to be interpreted in a descriptive and not in a limiting sense.

Objects of the invention include the provision of a connection between a bearing cap and its support so constructed and arranged as to eliminate the need of relying upon the fit of the cap on a bolt or other securing means for maintaining the desired alignment between the cap and its supporting means; the provision of a connection between a bearing cap and its support each involving two spaced surfaces adapted for complementary face-to-face engagement and in which such faces are each provided with curved serrations, the serrations of opposed surfaces interfitting one another in complementary relationship; the provision of a construction as above described in which the serrations on each of said faces each have a center of curvature disposed outwardly of said faces from the space between the faces of the members; and the provision of a construction as above described in which the serrations on each face are all struck from a common center.

The above being among the objects of the present invention, the same consists of certain new and novel features of construction and combinations of parts to be hereinafter described with reference to the accompanying drawing, and then claimed, having the above as well as other objects in view.

In the accompanying drawing which illustrates suitable embodiments of the present invention and in which like numerals refer to like parts throughout the several different views, Fig. 1 is a side elevational view of a connecting rod;

Fig. 2 is an enlarged horizontal sectional view taken on the line 2—2 of Fig. 1 and illustrating the serrations on both surfaces of the connecting rod cap adapted for face-to-face engagement with corresponding surfaces on the main body of the connecting rod;

Fig. 3 is an enlarged transverse vertical sectional view taken on the line 3—3 of Fig. 1 and illustrating the interengagement of the serrations on the opposed faces of the cap and rod;

Fig. 4 is a fragmentary perspective view of a different form of rotatable shaft support having a removable bearing cap; and, Fig. 5 is an enlarged horizontal sectional view taken on the line 5—5 of Fig. 4 and illustrating the upper surface of the lower member in plan view.

Wherever a split bearing is employed in connection with a relatively rotatable element, it is of importance that the cap and the body of the bearing have their half bores accurately aligned with one another as otherwise the edge of one will project out over the edge of the other in the bore of the bearing where it will act in the nature of a scraper blade to scrape the lubricant off of the rotating element and thus aid in hastening the early destruction of the bearing or the rotatable element therein. The caps in most types of conventional split bearings are intended to be aligned with the supporting portion of the bearing by means of one or more studs, bolts or screws passing through the cap on opposite sides of the bearing portion thereof. Such constructions require that the studs, bolts or screws very accurately fit the corresponding holes provided to receive them in the cap and supporting member and require that these holes in both members be accurately aligned if the final desired alignment of the bearing cap and its supporting member is to be obtained. If fact, the degree of accuracy required to obtain perfect alignment in this respect is so great that it is seldom consistently obtained in commercial practice. Constructions have been proposed and employed in which either the bearing cap or its supporting member is machined to provide parallel side edges and the remaining member is machined to provide walls between which such side edges are closely and accurately received. While such constructions are satisfactory, they are not desirable particularly in mass production for the reason that it is much more difficult and expensive to machine the mating faces of the bearing cap and its supporting element where each involves angularly disposed surfaces, than in cases where such surfaces are preferably flat.

The present invention overcomes the disadvantages of previous types of construction in that it employs perfectly flat faces between the bearing cap and its supporting part, and it eliminates the reliance upon the studs, bolts or screws for maintaining the alignment between the cap and its supporting part and, therefore, permits the employment of greater manufacturing tolerances for such studs, bolts or screws and their corresponding openings in the members, and yet it provides a construction which is relatively economical to employ which insures absolute alignment of the bearing cap and its supporting member at all times. This is accomplished by providing the mating surfaces of the bearing cap and its supporting member, which are flat, with a multiplicity of serrations so constructed and arranged that the serrations on one of the members interfits with the serrations on the other of the members and the serrations are so constructed and arranged that when interengaged with one another relative lateral displacement of one of the members with respect to the other in the plane of their matching faces is positively prohibited.

Referring now to the accompanying drawing and particularly to Figs. 1, 2 and 3, the numeral 10 indicates generally a connecting rod of the general type employed in internal combustion engines, having a small end 12 provided with a bore 14 for receiving the usual wrist pin (not shown) serving to connect a piston to the connecting rod, and a big end 16 provided with a bore 18 for receiving the crank pin of a crankshaft (not shown). The bore 18 of the big end 16 may receive the outer race of a rolling anti-friction bearing assembly or it may be formed to directly receive rolling anti-friction elements. On the other hand it may be conventionally lined with a bearing 20 which may be either of the type which is poured into place and then machined or may be of the split shell prefabricated type now conventionally employed in most internal combustion engines and which may be assumed to be employed in the particular case shown. The big end 16 is split diametrically of the bore 18 so that the lower half 22 thereof is removable and is commonly termed the "cap." The cap 22 is, in accordance with conventional practice, secured to the main body portion of the rod by means of screws or bolts 24, one located at each side of the rod, and which project down through suitable openings provided therefor in both the main body portion of the rod 10 and the cap 22 thereof and receive nuts 26 thereon for the purpose of drawing the cap tightly to the rod. As previously mentioned, in the case of the present invention while the screws or bolts 24 are preferably of a relatively close fit in the corresponding openings in the rod and cap and such openings in the rod and cap are preferably accurately aligned, a much greater manufacturing tolerance in these bolts or screws and openings is permissible in accordance with the present invention than in accordance with conventional practice. In other words, in accordance with the present invention the bolts 24 are depended upon only to maintain the cap 22 in tight engagement with the main body portion of the rod 10 and are not depended upon, or at least are depended upon only to a minor extent, in maintaining the alignment of the cap 22 with respect to the main body portion of the rod 10.

From the above it will be appreciated that the cap 22 is provided on each side of the bore portion 18 thereof with a substantially flat surface arranged in contacting and face-to-face engagement with corresponding surfaces on the main body portion of the rod when the cap is assembled to the rod. In accordance with the present invention in order to maintain alignment of the cap 22 with the main body portion of the rod these flat contacting surfaces of the cap and rod are each provided with a plurality of serrations 30, the serrations on opposed contacting faces being complementary to one another and interengaging one another. Furthermore, as best illustrated in Fig. 2 the serrations 30 are curved and the serrations for each of such surfaces are struck from a point or center such as 32 disposed outwardly of such surface from the axis of the bore 18.

From the foregoing it will be appreciated that inasmuch as the serrations of each surface on each member are curved and the serrations on such one surface are curved away from the serrations on the other such surface, it is possible to assemble the cap to the main portion of the rod with the serrations in interfitting relation in one position only and that when such serrations are in interfitting relationship the cap is positively locked to the main portion of the rod against movement in any direction in the plane of the joint between the cap and the rod. Where the serrations properly fit one another it will, therefore, be possible to assemble and disassemble the cap from the rod any number of times with the assurance that when it is replaced it will be located in exactly the same relation to the rod in every case.

In the broader aspects of the invention the cross-sectional configuration of the serrations 30 may vary according to the wishes of the individual designer as long as the serrations on the two parts properly intermesh when the parts are assembled together. In other words, the sides of the serrations may be arranged perpendicularly with respect to the general plane of the surface on which they are formed or they may be disposed at an angle thereto as shown. This last type of serration is usually preferable because of the greater ease in machining it.

Where the bearing element 20 in the bore 18 of the big end 16 is to be of the poured type tinned directly to the wall of the bore 18, this will usually be accomplished while the cap 22 is still integral with the main body portion 10 of the rod, after which the cap will be cut off, the opposed surfaces of the rod and cap serrated and then re-assembled together and the bore of the bearing 20 finished. Where a split shell type of bearing 20 is to be employed, or when rolling anti-friction bearings are to be used as previously suggested then after the opposed faces of the cap 22 in the main portion of the rod 10 have been serrated and the cap 22 bolted in place, the bore 18 is then machined out to required dimensions to receive the bearing or bearing elements or parts.

In Figs. 4 and 5 a construction is shown which may be assumed to be a pillow block for a rotatable shaft, a spindle bearing for a machine tool or like structure. In this case the supporting part which is here illustrated at 40 has the cap 42 secured thereto by means of bolts 44 and nuts 46. The parts 40 and 42 have contacting faces arranged in a common plane in which lies the axis of a bore 48 formed half in the member 40 and half in the cap 42. The opposed faces of the members 40 and 42 are provided with serrations 50 of the same general character as the serrations 30 previously described and which, like the serrations 30, are arranged in complementary and interengaging relationship when the members 40 and 42 are secured together. The bore 48 may, of course, be provided with a suitable Babbitt or other liner such as 52, or any other suitable type of bearing element or device. All of the advantages of the previously described construction are, of course, present in the construction illustrated in Figs. 4 and 5.

Having thus described my invention, what I claim by Letters Patent is:

1. In combination with a pair of members each having a pair of co-planar surfaces spaced from each other and arranged in opposed and contacting relationship with respect to the corresponding surfaces of the other of said members, a plurality of curved serrations of uniform cross-sectional configuration on each of said surfaces, the serrations on one surface of each member curving away from the serrations on the other surface of said member and the serrations on opposed surfaces of said members being complementary to one another arranged in interengaging relationship.

2. In combination a pair of members each having a pair of substantially co-planar surfaces arranged in spaced relation with respect to each other, each of said surfaces on each of said members being arranged in opposed and contacting relationship with respect to a corresponding surface of the other of said members, a plurality of serrations of uniform cross-sectional configuration on each of said surfaces, the serrations on each of said surfaces being curved about a point lying outwardly thereof with respect to the space between said surfaces of the corresponding member.

3. In combination, a pair of members secured together in face-to-face relation and formed to provide a bore between them, and a plurality of interengaging and complementary serrations of uniform cross-sectional configuration on said opposing surfaces, said serrations on opposite sides of said bore curving outwardly away from said bore.

4. In combination, a pair of members having substantially flat contacting co-planar faces and having a bore formed between them, serrations of uniform cross-sectional configuration formed on said faces, the serrations formed on one of said members being complementary to and interfitting with the serrations formed on the other of said members, the serrations on each face being curved and struck from a center disposed outwardly of said face from said bore.

5. In a bearing structure, in combination, a supporting part and a cap therefor cooperating to form a bearing bore between them and having substantially flat faces arranged in a plane including the axis of said bore, complementary and interfitting serrations of uniform cross-sectional configuration formed on the opposed faces of said supporting part and said cap, said serrations on each of said faces being curved and struck from the center disposed outwardly away from said bore on the same side thereof as said serrations are formed.

JULIUS DUSEVOIR.